United States Patent
Park (10) Patent No.: US 12,439,339 B1
(45) Date of Patent: Oct. 7, 2025

(54) METHOD AND APPARATUS FOR POWER SAVING USING TRACKING REFERENCE SIGNAL CONFIGURATION

(71) Applicant: Mentats Co., Ltd., Seoul (KR)

(72) Inventor: DaeHeum Park, Suwon-si (KR)

(73) Assignee: Mentats Co., Ltd., Seoul (KR)

( * ) Notice: Subject to any disclaimer, the term of this patent is extended or adjusted under 35 U.S.C. 154(b) by 0 days.

(21) Appl. No.: 19/217,560

(22) Filed: May 23, 2025

(30) Foreign Application Priority Data

Jun. 3, 2024 (KR) .................. 10-2024-0072561

(51) Int. Cl.
*H04W 52/02* (2009.01)
*H04L 27/26* (2006.01)
*H04W 76/27* (2018.01)

(52) U.S. Cl.
CPC ... *H04W 52/0235* (2013.01); *H04L 27/26025* (2021.01); *H04W 76/27* (2018.02)

(58) Field of Classification Search
CPC .............. H04W 52/0235; H04W 76/27; H04L 27/26025
See application file for complete search history.

(56) References Cited

U.S. PATENT DOCUMENTS

2022/0408337 A1* 12/2022 Kazmi .................. G01S 13/765
2024/0187988 A1* 6/2024 Maleki .............. H04W 52/0216

* cited by examiner

*Primary Examiner* — Mohammad S Anwar
(74) *Attorney, Agent, or Firm* — Bridgeway IP Law Group, PLLC; Jihun Kim (57) ABSTRACT

Provided are a method and apparatus for power saving using tracking reference signal configuration in a wireless communication system. A terminal may receive a first system information block (SIB) including a first tracking reference signal (TRS) configuration. Further, the terminal may use the received first TRS configuration for power saving in at least one radio resource control (RRC) state. The first SIB including the first TRS configuration may be separate from a second SIB including a second TRS configuration.

16 Claims, 6 Drawing Sheets

METHOD AND APPARATUS FOR POWER SAVING USING TRACKING REFERENCE SIGNAL CONFIGURATION

CROSS-REFERENCE TO RELATED APPLICATIONS

This application claims the priority of Korean Patent Application No. 10-2024-0072561 filed on Jun. 3, 2024, in the Korean Intellectual Property Office, the disclosure of which is incorporated herein by reference.

BACKGROUND OF THE DISCLOSURE

Field of the Disclosure

The present disclosure relates to a wireless communication system applicable to 4G, 5G and 6G.

Related Art

With the continuous development of mobile communication technologies, the transition from 4G to 5G has brought about significant improvements in various aspects of wireless communication. These advancements are designed to meet the ever-growing demands of modern applications, such as high-speed mobile broadband, massive connectivity for Internet of Things (IoT) devices, and ultra-reliable low-latency communications. The key areas of development in 5G can be categorized into enhanced Mobile Broadband (eMBB), massive Machine Type Communications (mMTC), and Ultra-Reliable Low-Latency Communications (URLLC), each addressing distinct use cases and requirements that were challenging for 4G technologies.

Enhanced Mobile Broadband (eMBB)

In 4G, Long-Term Evolution (LTE) technology provided high-speed mobile broadband, with peak download speeds reaching up to 1 Gbps. While this met the needs of high-definition video streaming, mobile gaming, and other data-intensive services, the increasing demand for higher speeds and larger data volumes necessitated further innovation. 5G addresses these challenges by offering up to 20 Gbps download speeds, enabling new applications such as 4K/8K video streaming, virtual reality (VR), augmented reality (AR), and large-scale data transfers. The introduction of technologies such as massive MIMO, beamforming, and the use of millimeter-wave frequencies have enabled 5G to deliver these improved capabilities, meeting the growing demand for mobile broadband.

Massive Machine Type Communications (mMTC)

The emergence of the Internet of Things (IoT) has brought about the need for a vast number of connected devices. However, 4G LTE technology was not optimized for massive device connectivity, as it primarily focused on human-to-human communication. Moreover, 4G faced limitations in terms of energy efficiency, scalability, and the ability to handle a large number of connected devices simultaneously. 5G addresses these issues by introducing mMTC, which supports the connection of millions of devices with minimal energy consumption and long battery life. By utilizing Low-Power Wide-Area Networks (LPWAN) and network slicing, 5G ensures efficient connectivity for massive IoT deployments, including smart cities, agriculture, healthcare, and other large-scale IoT ecosystems.

Ultra-Reliable Low-Latency Communications (URLLC)

4G networks, while offering low latency for mobile broadband, were not optimized for ultra-reliable and real-time communication, which is essential for applications such as autonomous driving, remote surgery, and industrial automation. The need for ultra-reliable, low-latency communication with near-instantaneous response times prompted the development of URLLC in 5G. With 5G, latency is reduced to as low as 1 millisecond, enabling real-time communication and control. This advancement is critical for applications that require immediate decision-making, such as autonomous vehicles that rely on real-time vehicle-to-vehicle and vehicle-to-infrastructure communication, as well as remote medical procedures and industrial automation systems that require precise, instantaneous control.

These developments have made 5G a pivotal technology in transforming the way industries operate and society interacts with the digital world. The ongoing evolution from 4G to 5G represents a significant leap forward in enabling new use cases, increasing network efficiency, and enhancing user experience.

Looking ahead, 6G is expected to further expand the capabilities of 5G, focusing on even higher speeds, ultra-high reliability, and the integration of advanced technologies like AI and holographic communications. It is anticipated that 6G will enable more immersive and seamless experiences, such as truly ubiquitous connectivity, advanced immersive technologies like mixed reality (XR), and autonomous systems that operate in real-time with zero latency. The evolution from 4G to 5G and eventually to 6G highlights the continuous progress in wireless communication technologies and their increasing role in shaping the future of the digital world.

SUMMARY OF THE DISCLOSURE

The disclosure is to provide a method and apparatus for efficient power saving using a tracking reference signal configuration in a wireless communication system.

According to an embodiment, a method of a terminal may be provided for operating in a wireless communication system. The method of the terminal may include receiving a first system information block (SIB) including a first tracking reference signal (TRS) configuration. The method of the terminal may further include using the received first TRS configuration for power saving in at least one radio resource control (RRC) state. The first SIB including the first TRS configuration may be separate from a second SIB including a second TRS configuration.

According to another embodiment, a terminal may be provided for operating in a wireless communication system. The terminal may include a processor configured to cause the terminal to receive a first system information block (SIB) including a first tracking reference signal (TRS) configuration. The processor is further configured to cause the terminal to use the received first TRS configuration for power saving in at least one radio resource control (RRC) state. The first SIB including the first TRS configuration may be separate from a second SIB including a second TRS configuration.

The at least one RRC state may comprise an RRC idle state and an RRC inactive state.

Meanwhile, the first TRS configuration may include first periodicity and offset information configured with one periodicity value in a first set consisting of 10 slots, 20 slots, 40 slots, 80 slots, 160 slots, 320 slots and 640 slots.

The periodicity value of 160 slots may be applicable to subcarrier spacings of 30 kHz, 60 kHz and 120 kHz. The first periodicity and offset information may be configured with one offset value in a second set consisting of integers from 0 to 159 for the periodicity value of 160 slots.

The periodicity value of 320 slots may be applicable to subcarrier spacings of 60 kHz and 120 kHz. The first periodicity and offset information may be configured with one offset value in a third set consisting of integers from 0 to 319 for the periodicity value of 320 slots.

The periodicity value of 640 slots may be applicable to a subcarrier spacing of 120 kHz. The first periodicity and offset information may be configured with one offset value in a fourth set consisting of integers from 0 to 639 for the periodicity value of 640 slots.

The second TRS configuration may include second periodicity and offset information configured with one periodicity value in a fifth set consisting of 10 slots, 20 slots, 40 slots and 80 slots.

DESCRIPTION OF EXEMPLARY EMBODIMENTS

The technical terms used in this disclosure are intended to describe specific embodiments and should not be construed as limiting. Unless otherwise defined, these terms should be interpreted according to their generally understood meanings by those skilled in the art, without being overly broad or narrow. If a term does not fully represent the spirit of the disclosure, it should be understood as the most accurate technical term recognized by those skilled in the art.

The use of a slash (/) or a comma in the present disclosure may represent "and/or." For example, "A/B" may indicate "A and/or B," meaning it can refer to "only A," "only B," or "both A and B.".

Figure 1:
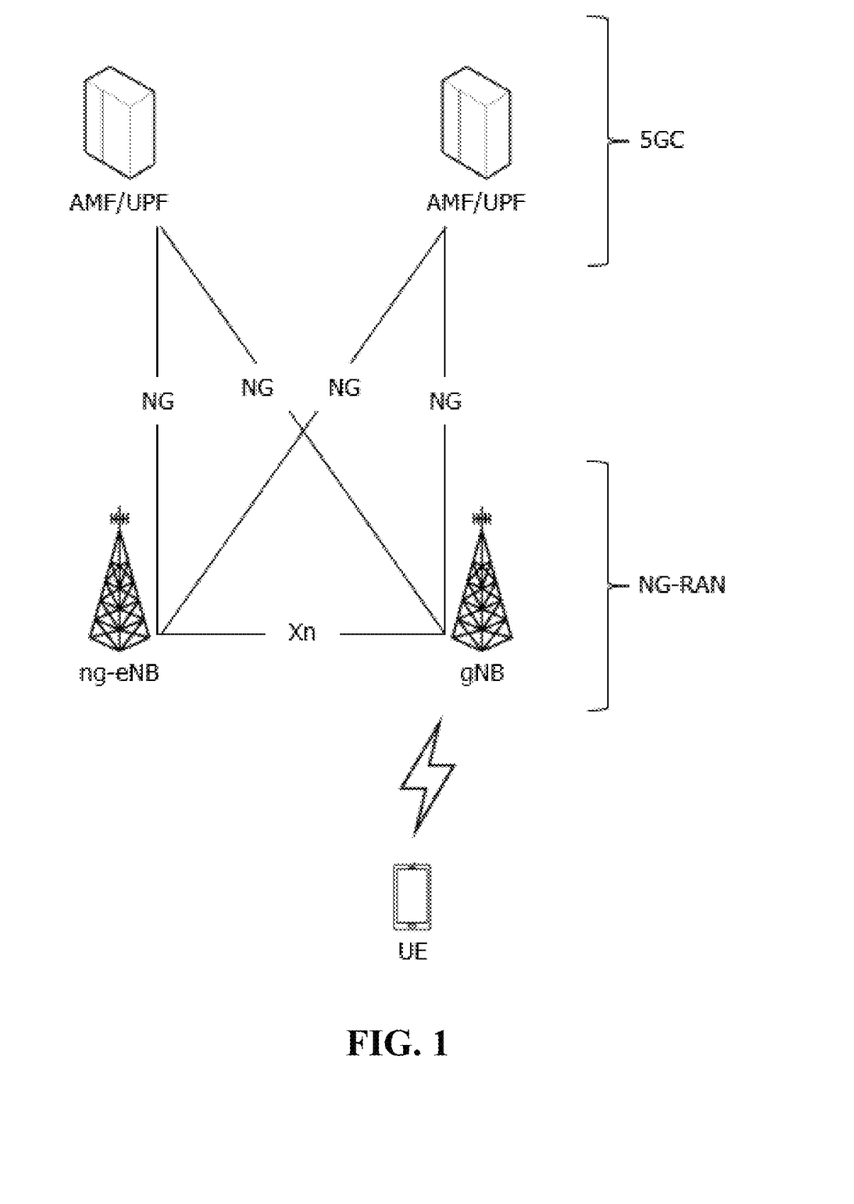
FIG. 1 illustrates a wireless communication system.

FIG. 1 illustrates a wireless communication system.

Referring to FIG. 1, the wireless communication system may be classified into a 5G core network (5GC) and a next generation-radio access network (NG-RAN), and the NG-RAN may include a base station (gNB and/or ng-eNB) that provides user plane and control plane protocol termination to a terminal (user equipment, UE). A next generation-Node B (gNB) provides an NR user plane and control plane protocol termination to the terminal, and a next generation-evolved node B (ng-eNB) provides an evolved-universal terrestrial radio access (E-UTRA) user plane and control plane protocol termination to the terminal (UE). The terminal (UE) may be fixed or mobile, and may be referred to as another term such as a mobile station (MS), a user terminal (UT), a subscriber station (SS), a mobile terminal (MT), a wireless device, etc. The base station (gNB and/or ng-eNB) may be a fixed station communicating with the terminal (UE), and may be referred to as another term such as a base transceiver system (BTS), an access point, etc.

The base station (gNB and/or ng-eNB) may be connected to each other through an Xn interface, and may be connected to a 5G core network (5GC) through an NG interface. Specifically, the base station (gNB and/or ng-eNB) may be connected to an access and mobility management function (AMF) through an NG-C interface, and may be connected to a user plane function (UPF) through an NG-U interface.

Figure 2:
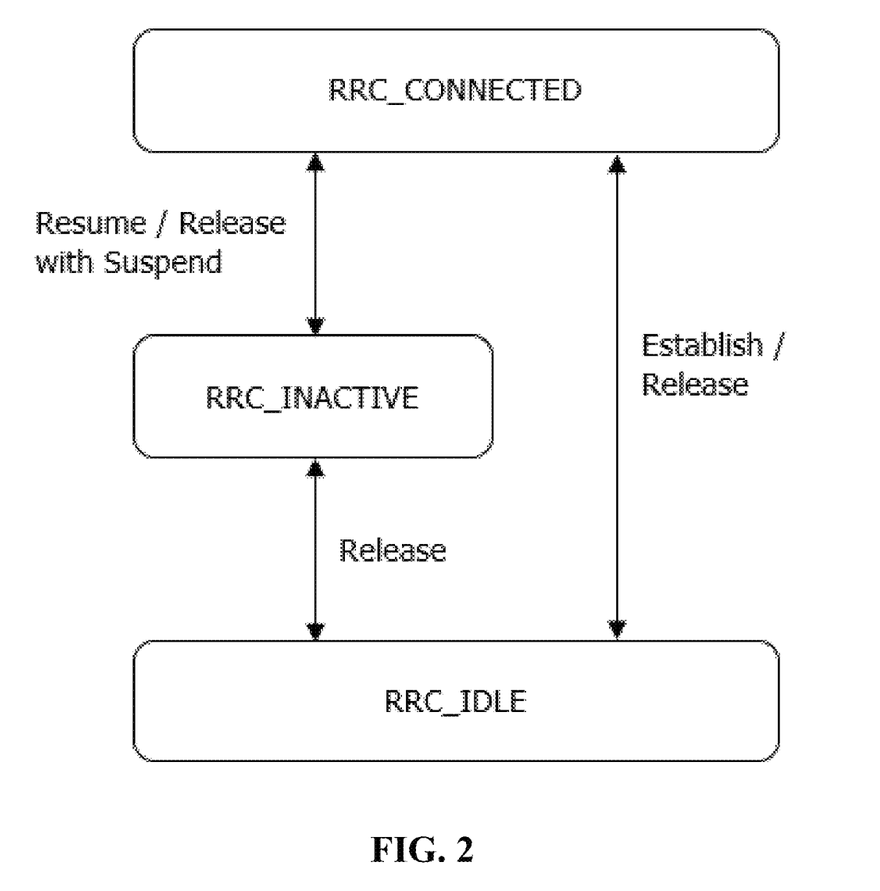
FIG. 2 illustrates UE state machine and state transitions in NR.

FIG. 2 illustrates UE state machine and state transitions in NR.

A UE is either in RRC_CONNECTED state or in RRC_INACTIVE state when an RRC connection has been established. If this is not the case, i.e. no RRC connection is established, the UE is in RRC_IDLE state. The RRC states can further be characterised as follows:

1. RRC_IDLE:
A UE specific DRX (Discontinuous Reception) may be configured by upper layers;
At lower layers, the UE may be configured with a DRX for PTM (Point to Multipoint) transmission of MBS (Multicast/Broadcast Services) broadcast;
UE controlled mobility based on network configuration;
The UE:
  i) Monitors Short Messages transmitted with P-RNTI (Paging-RNTI) over DCI (Downlink Control Information);
  ii) Monitors a Paging channel for CN (Core Network) paging using 5G-S-TMSI (5G-Serving-Temporary Mobile Subscriber Identity), except if the UE is acting as a L2 (Layer 2) U2N (UE-to-Network) Remote UE;
  iii) If configured by upper layers for MBS multicast reception, monitors a Paging channel for CN paging using TMGI (Temporary Mobile Group Identity);
  iv) Performs neighbouring cell measurements and cell (re-) selection;
  v) Performs measurements on L2 U2N Relay UEs and relay (re-) selection;
  vi) Acquires system information and can send SI request (if configured);
  vii) Performs logging of available measurements together with location and time for logged measurement configured UEs;
  viii) Performs idle/inactive measurements for idle/inactive measurement configured UEs;
  ix) If configured by upper layers for MBS broadcast reception, acquires MCCH change notification and MBS broadcast control information and data.

2. RRC_INACTIVE:
A UE specific DRX may be configured by upper layers or by RRC layer;
At lower layers, the UE may be configured with a DRX for PTM transmission of MBS broadcast and/or a DRX for PTM transmission of MBS multicast;
UE controlled mobility based on network configuration;
The UE stores the UE Inactive AS (Access Stratum) context;
A RAN-based notification area is configured by RRC layer;
Transfer of unicast data and/or signalling to/from UE over radio bearers configured for SDT.
The UE:
  i) Monitors Short Messages transmitted with P-RNTI over DCI;

ii) While T319a is running, monitors control channels associated with the shared data channel to determine if data is scheduled for it;
iii) While T319a is not running, monitors a Paging channel for CN paging using 5G-S-TMSI and RAN paging using fullI-RNTI (full Inactive RNTI), except if the UE is acting as a L2 U2N Remote UE;
iv) If configured by upper layers for MBS multicast reception, while T319a is not running, monitors a Paging channel for paging using TMGI;
v) Performs neighbouring cell measurements and cell (re-) selection;
vi) Performs measurements on L2 U2N Relay UEs and relay (re-) selection;
vii) Performs RAN-based notification area updates periodically and when moving outside the configured RAN-based notification area;
viii) Acquires system information and, while SDT (Small Data Transmission) procedure is not ongoing, can send SI (System Information) request (if configured);
ix) While SDT procedure is not ongoing, performs logging of available measurements together with location and time for logged measurement configured UEs;
x) While SDT procedure is not ongoing, performs idle/inactive measurements for idle/inactive measurement configured UEs;
xi) If configured by upper layers for MBS broadcast reception, acquires MCCH (MBS Control Channel) change notification and MBS broadcast control information and data;
xii) If configured for MBS multicast reception in RRC_INACTIVE, acquires multicast MCCH change notification and MBS multicast control information and data;
xiii) Transmits SRS (Sounding Reference Signal) for Positioning.

3. RRC_CONNECTED:

The UE stores the AS context;
Transfer of unicast data to/from UE;
Transfer of MBS multicast data to UE;
At lower layers, the UE may be configured with a UE specific DRX;
At lower layers, the UE may be configured with a DRX for PTM transmission of MBS broadcast and/or a DRX for MBS multicast;
At lower layers, the UE may be configured with a cell specific cell DTX/DRX;
For UEs supporting CA (Carrier Aggregation), use of one or more SCells (Secondary Cells), aggregated with the SpCell (Special Cell), for increased bandwidth;
For UEs supporting DC (Dual Connectivity), use of one SCG (Secondary Cell Group), aggregated with the MCG (Master Cell Group), for increased bandwidth;
Network controlled mobility within NR, to/from E-UTRA, and to UTRA-FDD;
Network controlled mobility (path switch) between a serving cell and a L2 U2N Relay UE, or vice versa, or between a source L2 U2N Relay UE and a target L2 U2N Relay UE;
Network controlled MP (Multi-Path) operation.

Figure 3:
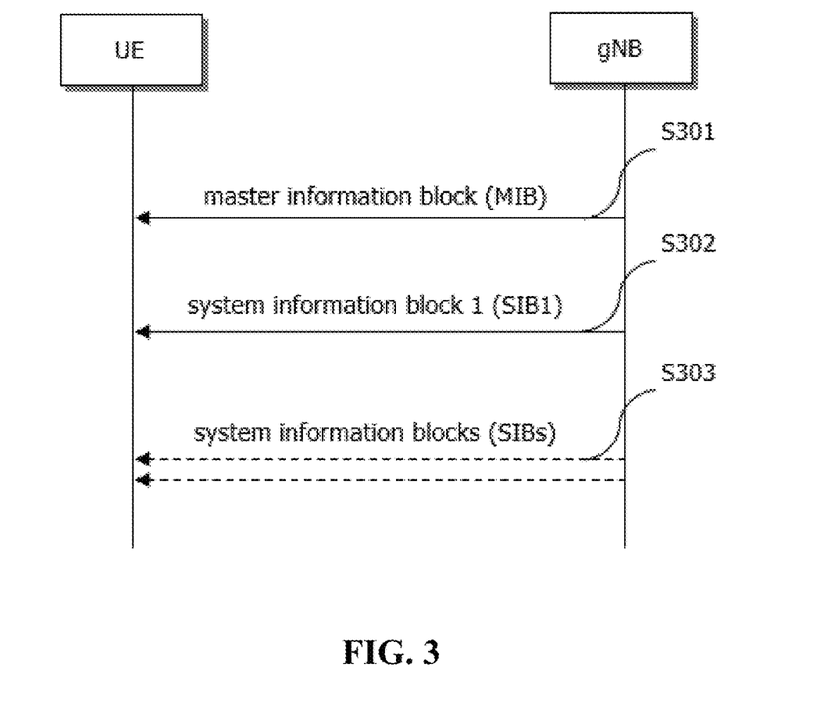
FIG. 3 illustrates a procedure of system information acquisition.

The UE:
i) Monitors Short Messages transmitted with P-RNTI over DCI, if configured;
ii) Monitors control channels associated with the shared data channel to determine if data is scheduled for it;
iii) Provides channel quality and feedback information;
iv) Performs neighbouring cell and/or L2 U2N relay measurements and measurement reporting;
v) Acquires system information;
vi) Performs immediate MDT measurement together with available location reporting;
vii) If configured by upper layers for MBS broadcast reception, acquires MCCH change notification and MBS broadcast control information and data FIG. 3 illustrates a procedure of system information acquisition.

System Information (SI) may be divided into a master information block (MIB), a system information block 1 (SIB1) and a number of SIBs. The MIB contains cell barred status information and essential physical layer information of the cell required to receive further system information.

The MIB is always transmitted on the broadcast channel (BCH) periodically (S301). The SIB1 defines the scheduling of other system information blocks and contains information required for initial access. The SIB1 is also referred to as Remaining Minimum SI (RMSI) and is periodically broadcast on downlink shared channel (DL-SCH) or sent in a dedicated manner on DL-SCH to UEs in RRC_CONNECTED (S302). The SIBs may either be periodically broadcast on DL-SCH, broadcast on-demand on DL-SCH or sent in a dedicated manner on DL-SCH to UEs in RRC_CONNECTED (S303).

The main SIBs may consist of:
SIB2 contains cell re-selection information, mainly related to a serving cell;
SIB3 contains information about the serving frequency and intra-frequency neighbouring cells relevant for cell re-selection (including cell re-selection parameters common for a frequency as well as cell specific re-selection parameters);
SIB4 contains information about other NR frequencies and inter-frequency neighbouring cells relevant for cell re-selection (including cell re-selection parameters common for a frequency as well as cell specific re-selection parameters), which can also be used for NR idle/inactive measurements;
SIB5 contains information about E-UTRA frequencies and E-UTRA neighbouring cells relevant for cell re-selection (including cell re-selection parameters common for a frequency as well as cell specific re-selection parameters);
SIB6 contains an ETWS (Earthquake and Tsunami Warning System) primary notification;
SIB7 contains an ETWS secondary notification;
SIB8 contains a CMAS (Commercial Mobile Alert System) warning notification;
SIB9 contains information related to Global Positioning System (GPS) time and Coordinated Universal Time (UTC);
SIB10 contains the Human-Readable Network Names (HRNN) of the Non-Public Networks (NPNs) listed in SIB1;
SIB11 contains information related to idle/inactive measurements;
SIB15 contains information related to disaster roaming;
SIB16 contains slice-based cell reselection information;
SIB17 contains information related to TRS configuration for UEs in RRC_IDLE/RRC_INACTIVE;
SIBpos contains positioning assistance data;
SIB18 contains information related to the Group IDs for Network selection (GINs) associated with Stand-alone Non-Public Networks (SNPNs) listed in SIB1.

SIB19 in TN (Terrestrial Network) contains NTN (Non-Terrestrial Network)-specific parameters for NTN neighbour cells.

In NR, a tracking reference signal (TRS) has been introduced as a type of downlink reference signal to support efficient UE time tracking and power saving, particularly in RRC_IDLE and RRC_INACTIVE states. TRS enables a UE to maintain time synchronization with the network while minimizing the need to monitor other downlink signals. By periodically receiving only the TRS based on configured periodicity and offset, the UE may reduce its power consumption without losing synchronization, which is essential for accurate paging reception and fast resumption of communication. TRS configurations may be provided through SIB17, and multiple TRS configurations may coexist to support different use cases or RRC states.

Figure 4:
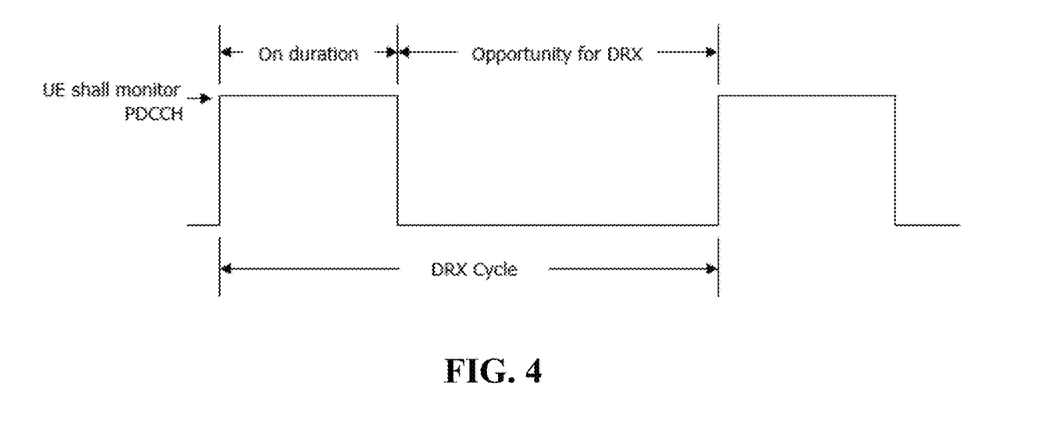
FIG. 4 illustrates an example of a discontinuous reception (DRX) cycle.

FIG. 4 illustrates an example of a discontinuous reception (DRX) cycle.

To reduce UE power consumption (i.e. UE power saving), the PDCCH monitoring activity of the UE in RRC_CONNECTED state is governed by DRX (Discontinuous Reception), BA (Bandwidth Adaptation), DCP (DCI with CRC (Cyclic Redundancy Check) scrambled by PS-RNTI) and cell DTX (Discontinuous Transmission).

When DRX is configured, the UE does not need to continuously monitor the PDCCH (Physical Downlink Control Channel). DRX characterized by the following:
  on-duration: duration that the UE waits for, after waking up, to receive PDCCHs. If the UE successfully decodes a PDCCH, the UE stays awake and starts the inactivity timer;
  inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions);
  retransmission-timer: duration until a retransmission can be expected;
  cycle: specifies the periodic repetition of the on-duration followed by a possible period of inactivity;
  active time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

UE power saving in RRC_IDLE/RRC_INACTIVE state may be achieved by providing the configuration for TRS with CSI-RS (Channel State Information-Reference Signal) for tracking in TRS occasions. The TRS in TRS occasions may allow UEs in RRC_IDLE/RRC_INACTIVE state to sleep longer before waking-up for its paging occasion. The TRS occasions configuration is provided in SIB17. The availability of TRS in the TRS occasions is indicated by L1 (layer 1) availability indication. These TRSs may also be used by the UEs configured with eDRX (extended Discontinuous Reception).

The periodicity and offset information for the TRS is represented by the periodicityAndOffset information element under TRS-ResourceSet in SIB17. The intended periodicities for the TRS is 10, 20, 40 and 80 ms. However, the periodicity indicated by periodicity AndOffset is expressed in terms of 10, 20, 40 and 80 slots. Certain periodicities cannot be signaled due to their dependency on the subcarrier spacing (SCS). Specifically, 80 ms periodicity for SCS 30 kHz, 40/80 ms for SCS 60 kHz, and 20/40/80 ms for SCS 120 kHz cannot be signaled, as shown in Table 1 below.

TABLE 1

| TRS periodicity | SCS | | | |
| --- | --- | --- | --- | --- |
| | 15 kHz | 30 kHz | 60 kHz | 120 kHz |
| 10 slots | 10 ms | | | |
| 20 slots | 20 ms | 10 ms | | |
| 40 slots | 40 ms | 20 ms | 10 ms | |
| 80 slots | 80 ms | 40 ms | 20 ms | 10 ms |
| | | 80 ms | 40 ms | 20 ms |
| | | | 80 ms | 40 ms |
| | | | | 80 ms |

To address the issue described above, a new SIB is proposed while retaining the existing SIB17. The new SIB supports all the values listed in Table 1. The gNB shall not indicate the same values in both SIB17 and the new SIB. The new SIB may be used independently, i.e., without relying on SIB17. The gNB should not broadcast both SIB17 and the new SIB simultaneously; instead, the gNB should broadcast either SIB17 or the new SIB, but not both.

The periodicity indicated by periodicity AndOffset under TRS-ResourceSet in the new SIB is expressed in terms of 10, 20, 40, 80, 160, 320 and 640 slots.

Figure 5:
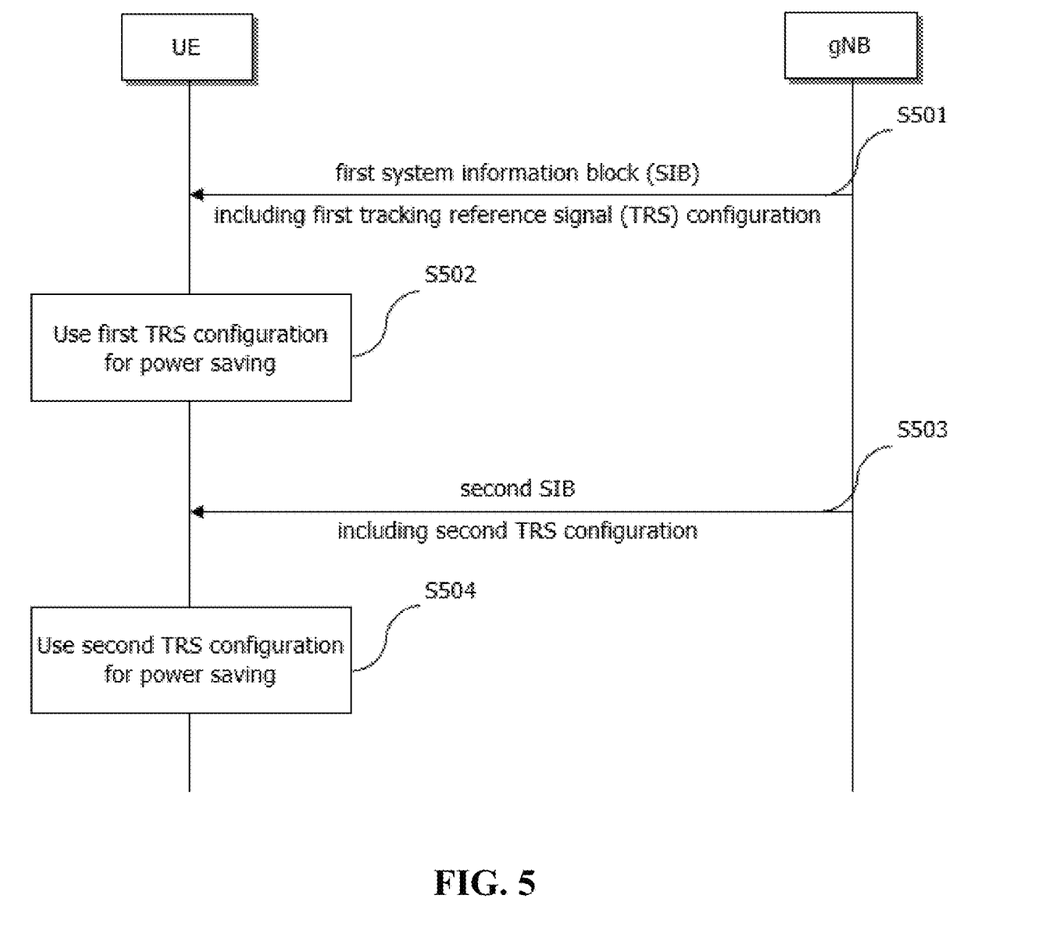
FIG. 5 illustrates a procedure between a terminal and a base station according to an embodiment of the disclosure.

FIG. 5 illustrates a procedure between a terminal and a base station according to an embodiment of the disclosure.

Referring to FIG. 5, a terminal (UE) receives a first system information block (SIB) including a first tracking reference signal (TRS) configuration from a base station (gNB) (S501). The terminal uses the received first TRS configuration for power saving in at least one radio resource control (RRC) state (S502). In other words, the terminal performs power saving using the received first TRS configuration in at least one RRC state. The at least one RRC state may comprise an RRC idle state and an RRC inactive state. The first SIB including the first TRS configuration may be separate from a second SIB including a second TRS configuration. The first SIB may correspond to the aforementioned new SIB, and the second SIB may correspond to the existing SIB17.

Meanwhile, the first TRS configuration may include first periodicity and offset information configured with one periodicity value in a first set consisting of 10 slots, 20 slots, 40 slots, 80 slots, 160 slots, 320 slots and 640 slots.

The periodicity value of 160 slots may be applicable to subcarrier spacings of 30 kHz, 60 kHz and 120 kHz. The first periodicity and offset information may be configured with one offset value in a second set consisting of integers from 0 to 159 for the periodicity value of 160 slots.

The periodicity value of 320 slots may be applicable to subcarrier spacings of 60 kHz and 120 kHz. The first periodicity and offset information may be configured with one offset value in a third set consisting of integers from 0 to 319 for the periodicity value of 320 slots.

The periodicity value of 640 slots may be applicable to a subcarrier spacing of 120 KHz. The first periodicity and offset information may be configured with one offset value in a fourth set consisting of integers from 0 to 639 for the periodicity value of 640 slots.

The terminal may subsequently receive a second SIB including a second TRS configuration (S503). The terminal may then use the received second TRS configuration for power saving in the RRC idle/inactive state (S504). That is, the terminal may perform power saving based on the second TRS configuration instead of the first TRS configuration.

The second TRS configuration may include second periodicity and offset information configured with one periodicity value in a fifth set consisting of 10 slots, 20 slots, 40 slots and 80 slots.

Figure 6:
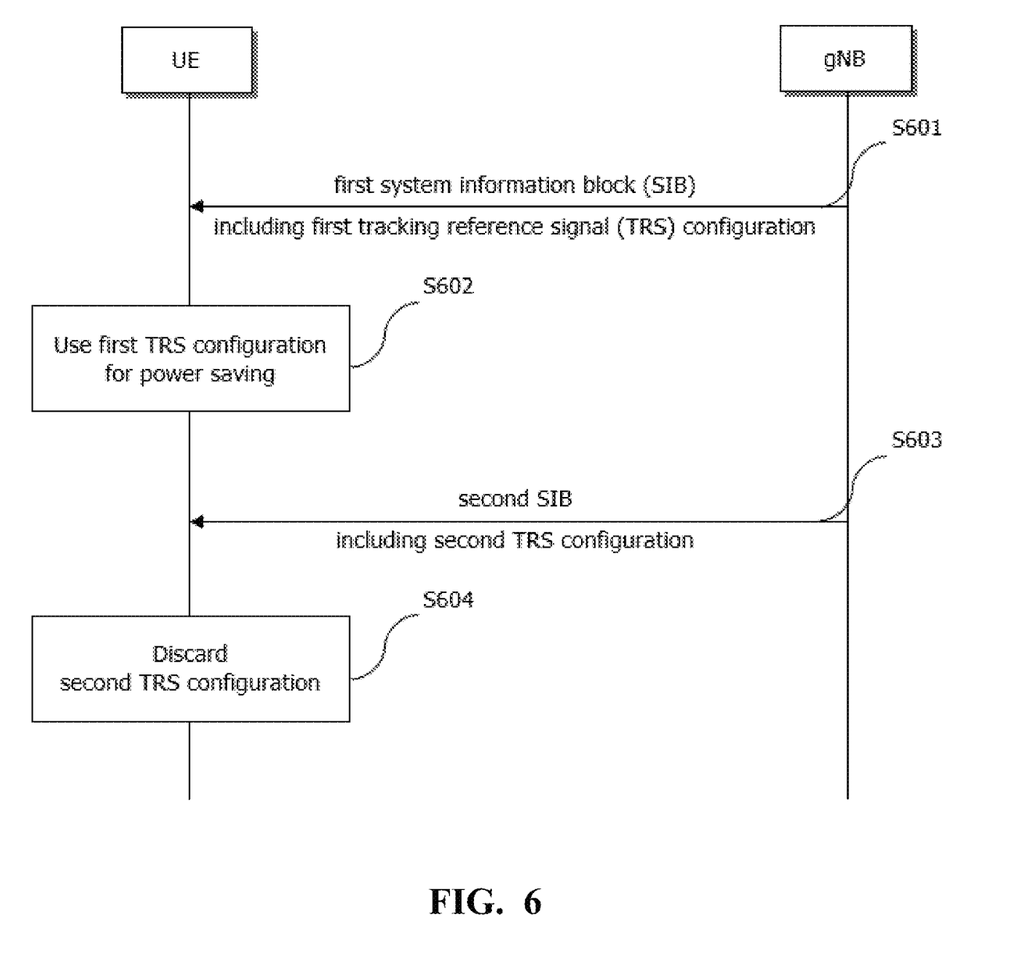
FIG. 6 illustrates a procedure between a terminal and a base station according to another embodiment of the disclosure.

FIG. 6 illustrates a procedure between a terminal and a base station according to another embodiment of the disclosure.

Referring to FIG. 6, a terminal (UE) receives a first system information block (SIB) including a first tracking reference signal (TRS) configuration from a base station (gNB) (S601). The terminal uses the received first TRS configuration for power saving in at least one radio resource control (RRC) state (S602). In other words, the terminal performs power saving using the received first TRS configuration in at least one RRC state. The at least one RRC state may comprise an RRC idle state and an RRC inactive state. The first SIB including the first TRS configuration may be separate from a second SIB including a second TRS configuration. The first SIB may correspond to the aforementioned new SIB, and the second SIB may correspond to the existing SIB17.

Meanwhile, the first TRS configuration may include first periodicity and offset information configured with one periodicity value in a first set consisting of 10 slots, 20 slots, 40 slots, 80 slots, 160 slots, 320 slots and 640 slots.

The periodicity value of 160 slots may be applicable to subcarrier spacings of 30 kHz, 60 kHz and 120 kHz. The first periodicity and offset information may be configured with one offset value in a second set consisting of integers from 0 to 159 for the periodicity value of 160 slots.

The periodicity value of 320 slots may be applicable to subcarrier spacings of 60 kHz and 120 kHz. The first periodicity and offset information may be configured with one offset value in a third set consisting of integers from 0 to 319 for the periodicity value of 320 slots.

The periodicity value of 640 slots may be applicable to a subcarrier spacing of 120 kHz. The first periodicity and offset information may be configured with one offset value in a fourth set consisting of integers from 0 to 639 for the periodicity value of 640 slots.

The terminal may subsequently receive a second SIB including a second TRS configuration (S603). The terminal may then discard the received second TRS configuration (S604) due to the previously received first TRS configuration. In other words, the first SIB corresponding to the aforementioned new SIB takes precedence over the second SIB corresponding to the existing SIB17.

The second TRS configuration may include second periodicity and offset information configured with one periodicity value in a fifth set consisting of 10 slots, 20 slots, 40 slots and 80 slots.

The aforementioned new SIB (e.g., SIBab) may include the first TRS configuration as shown in Table 2.

TABLE 2

```
-- ASN1START
-- TAG-SIBab-START
...
TRS-ResourceSet ::=      SEQUENCE {
    ...
    periodicity AndOffset    CHOICE {
        slots10                  INTEGER (0..9),
        slots20                  INTEGER (0..19),
        slots40                  INTEGER (0..39),
        slots80                  INTEGER (0..79),
```

TABLE 2-continued

```
        slots160                 INTEGER (0..159),
        slots320                 INTEGER (0..319),
        slots640                 INTEGER (0..639)
    },
...
-- TAG-SIBab-STOP
-- ASN1STOP
```

The periodicityAndOffset information element in Table 2 defines the periodicity and slot offset (slot) for periodic TRS. It is used to determine the location of the first slot of TRS resource set. In addition, the association between the TRS periodicities and the SCS is shown as Table 3.

TABLE 3

| TRS periodicity | SCS | | | |
| --- | --- | --- | --- | --- |
| | 15 kHz | 30 kHz | 60 kHz | 120 kHz |
| 10 slots | 10 ms | | | |
| 20 slots | 20 ms | 10 ms | | |
| 40 slots | 40 ms | 20 ms | 10 ms | |
| 80 slots | 80 ms | 40 ms | 20 ms | 10 ms |
| 160 slots | | 80 ms | 40 ms | 20 ms |
| 320 slots | | | 80 ms | 40 ms |
| 640 slots | | | | 80 ms |

The aforementioned new SIB may be optionally present if the existing SIB17 is absent.

The disclosure described so far may be implemented through various means. For example, the embodiment may be implemented by hardware, firmware, software, or a combination thereof. Specifically, the implementation will be described below with reference to the accompanying drawing.

Figure 7:
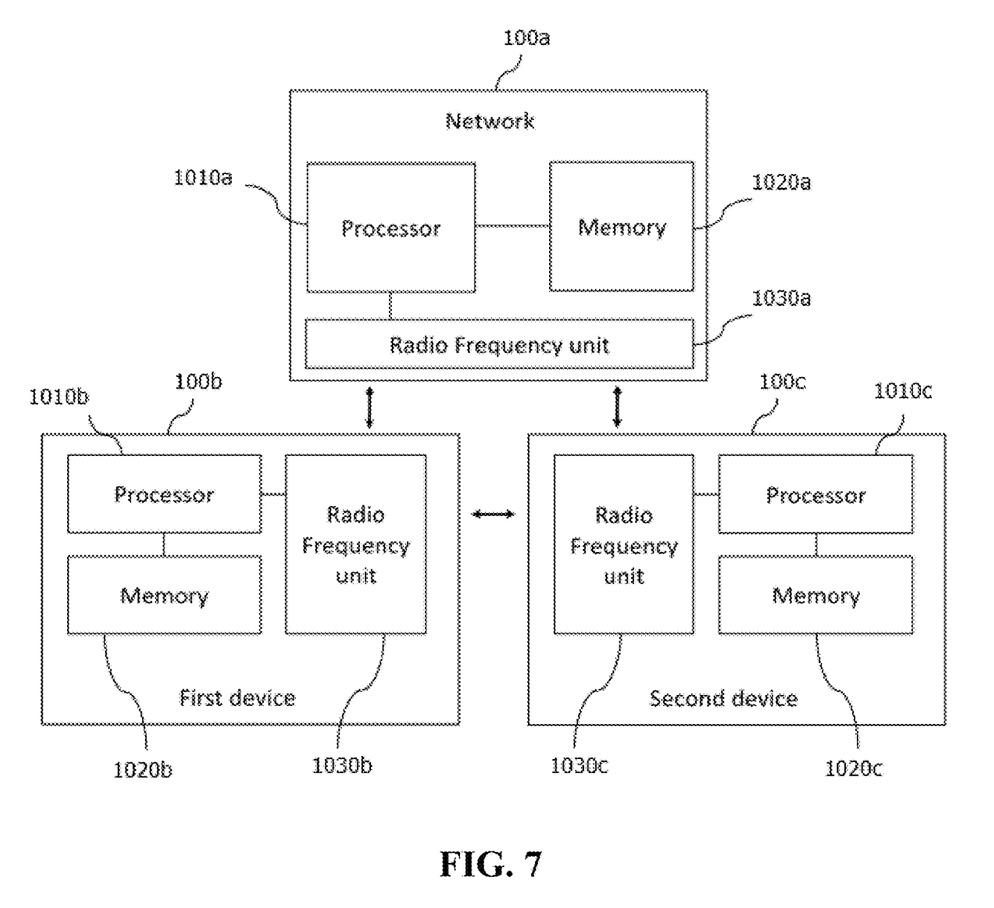
FIG. 7 is a block diagram showing apparatuses according to an embodiment of the disclosure.

FIG. 7 is a block diagram showing apparatuses according to an embodiment of the disclosure.

Referring to FIG. 7, a wireless communication system may include a network 100a, a first apparatus 100b and a second apparatus 100c.

The network 100a may include a base station, a network node, an apparatus related to 5G service, or other apparatuses related to the fourth industrial revolution.

The first device 100b may include a transmission terminal, a reception terminal, a wireless apparatus, a radio communication device, a vehicle, a vehicle with an autonomous driving function, a connected car, an unmanned aerial vehicle (UAV), an artificial intelligence (AI) module, a robot, an augmented reality (AR) apparatus, a virtual reality (VR) apparatus, a mixed reality (MR) apparatus, a hologram apparatus, a public safety apparatus, a machine-type communication (MTC) apparatus, an Internet of things (IoT) apparatus, a medial apparatus, a finance technology (FinTech) apparatus (or a financial apparatus), a security apparatus, a climate/environment apparatus, an apparatus related to a 5G service, or other apparatuses related to the fourth industrial revolution.

The second device 100c may include a transmission terminal, a reception terminal, a wireless apparatus, a radio communication device, a vehicle, a vehicle with an autonomous driving function, a connected car, an unmanned aerial vehicle (UAV), an artificial intelligence (AI) module, a robot, an augmented reality (AR) apparatus, a virtual reality (VR) apparatus, a mixed reality (MR) apparatus, a hologram apparatus, a public safety apparatus, a machine-type communication (MTC) apparatus, an Internet of things (IoT) apparatus, a medial apparatus, a finance technology (Fin- Tech) apparatus (or a financial apparatus), a security apparatus, a climate/environment apparatus, an apparatus related to a 5G service, or other apparatuses related to the fourth industrial revolution.

The network 100a may include at least one processor such as a processor 1010a, at least one memory such as a memory 1020a and at least one radio frequency unit such as a radio frequency unit 1030a. The processor 1010a may be tasked with executing the previously mentioned functions, procedures, and/or methods. The processor 1010a may be capable of implementing one or more protocols. For example, the processor 1010a may perform and manage one or more layers of a radio interface protocol. The memory 1020a may be connected to the processor 1010a, and configured to store various types of information and/or instructions. The radio frequency unit 1030a may be connected to the processor 1010a, and controlled to transceive radio signals.

The first device 100b may include at least one processor such as a processor 1010b, at least one memory such as a memory 1020b and at least one radio frequency unit such as a radio frequency unit 1030b. The processor 1010b may be tasked with executing the previously mentioned functions, procedures, and/or methods. The processor 1010b may be capable of implementing one or more protocols. For example, the processor 1010b may perform and manage one or more layers of a radio interface protocol. The memory 1020b may be connected to the processor 1010b, and configured to store various types of information and/or instructions. The radio frequency unit 1030b may be connected to the processor 1010b, and controlled to transceive radio signals.

The second device 100c may include at least one processor such as a processor 1010c, at least one memory such as a memory 1020c and at least one radio frequency unit such as a radio frequency unit 1030c. The processor 1010c may be tasked with executing the previously mentioned functions, procedures, and/or methods. The processor 1010c may be capable of implementing one or more protocols. For example, the processor 1010c may perform and manage one or more layers of a radio interface protocol. The memory 1020c may be connected to the processor 1010c, and configured to store various types of information and/or instructions. The radio frequency unit 1030c may be connected to the processor 1010c, and controlled to transceive radio signals.

The memory 1020a, the memory 1020b and/or the memory 1020c may be respectively connected inside or outside the processor 1010a, the processor 1010b and/or the processor 1010c and connected to other processors through various technologies such as wired or wireless connection.

According to the embodiment of the disclosure, efficient power saving may be achieved using a tracking reference signal configuration in a wireless communication system.

Although the preferred embodiments of the disclosure have been illustratively described, the scope of the disclosure is not limited to only the specific embodiments, and the disclosure can be modified, changed, or improved in various forms within the spirit of the disclosure and within a category written in the claim.

In the above exemplary systems, although the methods have been described in the form of a series of steps or blocks, the disclosure is not limited to the sequence of the steps, and some of the steps may be performed in different order from other or may be performed simultaneously with other steps. Further, those skilled in the art will understand that the steps shown in the flowcharts are not exclusive and may include other steps or one or more steps of the flowcharts may be deleted without affecting the scope of the disclosure.

Claims of the present disclosure may be combined in various manners. For example, technical features of the method claim of the present disclosure may be combined to implement a device, and technical features of the device claim of the present disclosure may be combined to implement a method. In addition, the technical features of the method claim and the technical features of the device claim of the present disclosure may be combined to implement a device, and technical features of the method claim and the technical features of the device claim of the present disclosure may be combined to implement a method.

What is claimed is:

1. A method for a terminal to operate in a wireless communication system, the method comprising:
   receiving a first system information block (SIB) including a first tracking reference signal (TRS) configuration; and
   using the received first TRS configuration for power saving in at least one radio resource control (RRC) state,
   wherein the first SIB including the first TRS configuration is separate from a second SIB including a second TRS configuration,
   wherein the first TRS configuration includes first periodicity and offset information configured with one periodicity value in a first set consisting of 10 slots, 20 slots, 40 slots, 80 slots, 160 slots, 320 slots and 640 slots,
   wherein the second TRS configuration includes second periodicity and offset information configured with one periodicity value in a fifth set consisting of 10 slots, 20 slots, 40 slots and 80 slots, and
   wherein the first SIB including the first TRS configuration is received when the second SIB including the second TRS configuration is absent.

2. The method of claim 1, wherein the at least one RRC state comprises an RRC idle state and an RRC inactive state.

3. The method of claim 1, wherein the periodicity value of 160 slots is applicable to subcarrier spacings of 30 kHz, 60 kHz and 120 kHz.

4. The method of claim 3, wherein the first periodicity and offset information is configured with one offset value in a second set consisting of integers from 0 to 159 for the periodicity value of 160 slots.

5. The method of claim 1, wherein the periodicity value of 320 slots is applicable to subcarrier spacings of 60 kHz and 120 kHz.

6. The method of claim 5, wherein the first periodicity and offset information is configured with one offset value in a third set consisting of integers from 0 to 319 for the periodicity value of 320 slots.

7. The method of claim 1, wherein the periodicity value of 640 slots is applicable to a subcarrier spacing of 120 kHz.

8. The method of claim 7, wherein the first periodicity and offset information is configured with one offset value in a fourth set consisting of integers from 0 to 639 for the periodicity value of 640 slots.

9. A terminal in a wireless communication system comprising:
   a processor configured to cause the terminal to:
   receive a first system information block (SIB) including a first tracking reference signal (TRS) configuration; and
   use the received first TRS configuration for power saving in at least one radio resource control (RRC) state, wherein the first SIB including the first TRS configuration is separate from a second SIB including a second TRS configuration, wherein the first TRS configuration includes first periodicity and offset information configured with one periodicity value in a first set consisting of 10 slots, 20 slots, 40 slots, 80 slots, 160 slots, 320 slots and 640 slots, wherein the second TRS configuration includes second periodicity and offset information configured with one periodicity value in a fifth set consisting of 10 slots, 20 slots, 40 slots and 80 slots, and wherein the first SIB including the first TRS configuration is received when the second SIB including the second TRS configuration is absent.

10. The terminal of claim 9, wherein the at least one RRC state comprises an RRC idle state and an RRC inactive state.

11. The terminal of claim 9, wherein the periodicity value of 160 slots is applicable to subcarrier spacings of 30 kHz, 60 kHz and 120 kHz.

12. The terminal of claim 11, wherein the first periodicity and offset information is configured with one offset value in a second set consisting of integers from 0 to 159 for the periodicity value of 160 slots.

13. The terminal of claim 9, wherein the periodicity value of 320 slots is applicable to subcarrier spacings of 60 kHz and 120 kHz.

14. The terminal of claim 13, wherein the first periodicity and offset information is configured with one offset value in a third set consisting of integers from 0 to 319 for the periodicity value of 320 slots.

15. The terminal of claim 9, wherein the periodicity value of 640 slots is applicable to a subcarrier spacing of 120 kHz.

16. The terminal of claim 15, wherein the first periodicity and offset information is configured with one offset value in a fourth set consisting of integers from 0 to 639 for the periodicity value of 640 slots.

* * * * *